Dec. 6, 1955  L. O. FOLTZ  2,726,058
INDICATOR MOUNTING FOR ALIGNMENT OF SHAFTS AND THE LIKE
Filed March 22, 1954
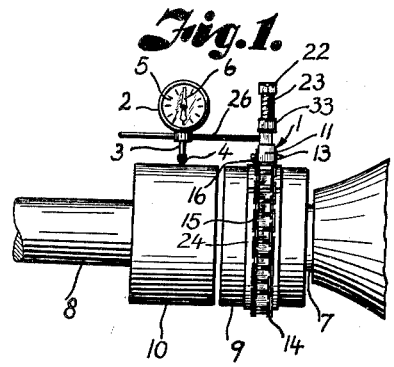
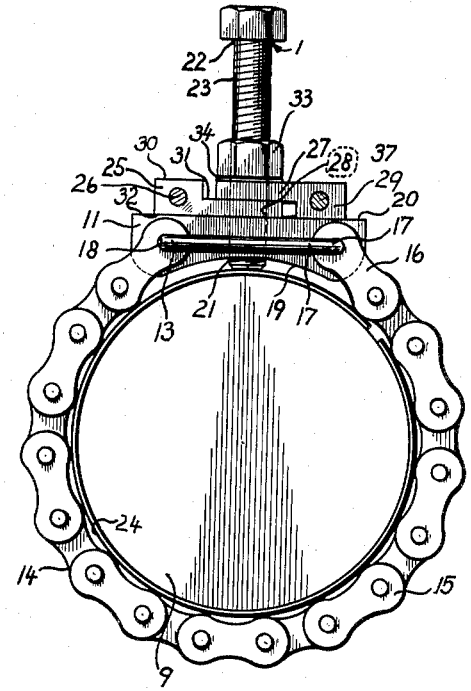
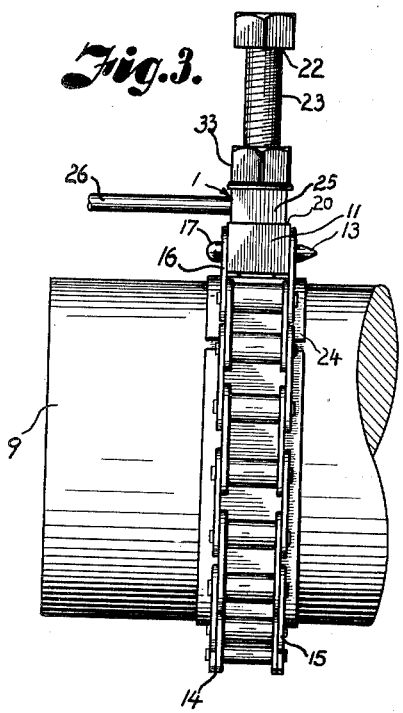
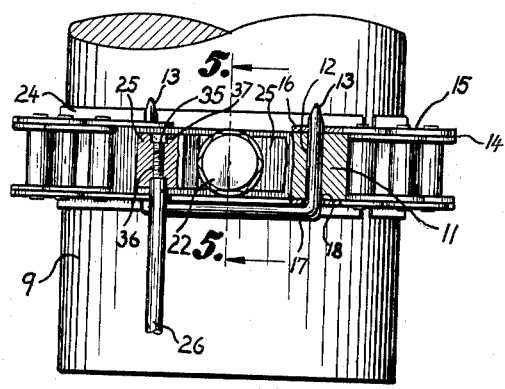
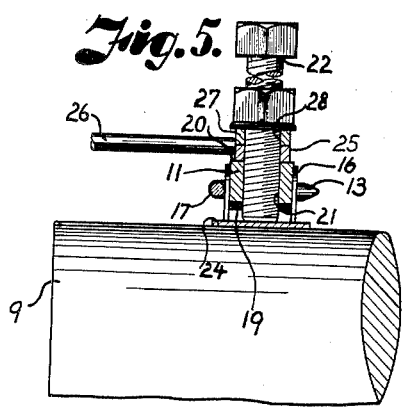
INVENTOR.
Luther O. Foltz.
BY
Fishburn & Mullendore
ATTORNEYS.

United States Patent Office 2,726,058
Patented Dec. 6, 1955

2,726,058

INDICATOR MOUNTING FOR ALIGNMENT OF SHAFTS AND THE LIKE

Luther O. Foltz, Oklahoma City, Okla.

Application March 22, 1954, Serial No. 417,889

4 Claims. (Cl. 248—231)

This invention relates to mechanism for aligning shafts and the like, and more particularly to a mounting structure for accurately supporting one or more indicators in the testing for misalignment of shafts and the like.

In the setting of heavy machinery, for example prime movers and machinery driven thereby or other installations involving two sections of shafts where both shafts are joined together as with a shaft coupling to operate as one unit, particularly where the shafts operate at high speed, it is necessary that the shafts be in accurate alignment so that the axis of one shaft will coincide with the axis of the other. It is common to find misalignment of the axes of shafts, and said misalignment may be angular or offset or various combinations thereof. Angular misalignment is where the axis of one shaft makes a slight angle with the axis of the other shaft with the axes in the same plane. Offset misalignment is that in which the shafts are parallel but one offset relative to the other. There may be combinations of angular offset misalignment, and the offset can be vertical or horizontal or vary between vertical and horizontal. Any of the misalignments can cause vibration, excessive wear and breakage, resulting in expensive replacement and maintenance.

The objects of the present invention are to provide a mounting for one or more dial indicators for use in alignment of shafts and the like which may be quickly and easily secured to one shaft section whereby the indicators engage the other shaft section; to provide such a mounting with a flexible member surrounding a spring sleeve or band for holding the flexible member in a substantially cylindrical shape facilitating application of the mounting to a shaft; to provide clamping means cooperating with the flexible member and spring sleeve or band whereby the band and flexible member are tightened to hold the structure against movement without damage to a polished shaft surface; to provide a split or sectional indicator post holder and base block with cooperating plane surfaces for swinging movement of the indicators carried thereon in parallel planes for adjustment in a plurality of directions in making proper contact with the shaft surfaces; and to provide an indicator mounting for alignment of shafts and the like which is economical to manufacture, yet quickly applied and accurate in operation of testing for misalignment of shafts.

In accomplishing these and other objects of the present invention, I have provided improved details of structure the preferred forms of which are illustrated in the accompanying drawings, wherein:

Fig. 1 is a side elevation of the indicator mounting applied to shaft sections to be aligned.

Fig. 2 is an end elevation of the mounting structure.

Fig. 3 is a side elevation of the indicator mounting with portions broken away to better illustrate the structure thereof.

Fig. 4 is a plan view of the indicator mounting with portions broken away to illustrate the structure thereof.

Fig. 5 is a vertical sectional view taken on the line 5—5, Fig. 4.

Referring more in detail to the drawings:

1 designates a mounting structure for a dial indicator 2 having a plunger or stem 3 terminating in an end 4 adapted to follow surfaces of shaft sections or couplings thereon. Movement of the end 4 toward or away from the dail 5 effects rotation of the hand 6 thereon. The indicator mounting 1 is illustrated in Fig. 1 in position for use in aligning shaft sections 7 and 8 which are adapted to be coupled together by coupling flanges 9 and 10. Only one dial indicator is illustrated, however, two dial indicators may be supported and the mounting may be applied directly to the shafts, hubs thereon or other structures having shafts to be accurately aligned.

The indicator mounting includes a base block 11 having spaced, parallel through apertures 12 adjacent each end for receiving pins 13 for connecting ends of a flexible member 14 to the base block. In the illustrated structure the flexible member consists of a plurality of links 15 of roller chain with the end links 16 of the length of chain straddling the ends of the base block 11 and engaging the side faces thereof, the base block preferably being of a width which closely fits between the spaced members of the end links 16 to provide only slight operating clearance therebetween. The pins 13 are preferably connected by a bar 17 to provide a U-shaped structure whereby the bar facilitates insertion of the pins 13 through apertures 18 in the free ends of the links 16 and through the apertures 12 aligned therewith to pivotally connect the links to the base block 11. The under face 19 of the base block is preferably arcuate in shape, with the radius of the curvature slightly greater than the radius of the shaft, hub or coupling to which the mounting is to be applied in order that the base block will be relatively close to the shaft surface and that each roller chain link will engage the shaft, coupling or hub to which it is to be applied.

The base block 11 has a plane, flat surface 20 oppositely disposed to the arcuate surface 19 and has a central threaded bore 21 extending through said block perpendicular to the plane upper surface 20 of said block. A clamp or tension bolt 22 has a threaded shank 23 screwed into the threaded bore 21. A split spring sleeve or band 24, having an inside diameter when the ends of the split sleeve are together of slightly less than the diameter of the shaft or hub to which the mounting is to be applied, is arranged on the interior of the flexible member 14 with the resilient action of said sleeve such that it tends to expand. When arranged inside of the flexible member and block structure as illustrated in Fig. 2 the spring sleeve tends to hold a flexible member in cylindrical shape, and with the clamp or tension bolt retracted the inside diameter of the sleeve is larger than the shaft or hub to which it is to be applied thereby facilitating the application of the mounting to the shaft or hub. By screwing the clamp or tension bolt into the base block 11 the end of the bolt shank 23 will bear on the spring sleeve 24 and move the base block away from the shaft or hub to which it is applied, tightening the flexible member around the sleeve to draw said sleeve into tight engagement with the shaft or hub. With this arrangement the sleeve 24 distributes the pressure from the flexible member and protects any polished surface on the shaft or hub from being marred or otherwise damaged due to the pressure of the flexible member.

One or more blocks 25 are arranged on the bolt 22 in engagement with the upper surface 20 of the base block for supporting the post 26 of the indicator 2. In the illustrated structure the post holder blocks are a split or two-piece arrangement with each of the two pieces of identical shape and size. Each of the two-piece post holder block structures has flat bar members 27 provided with bores 28 whereby the bar members may be sleeved on the shank 23 of the tension bolt 22. The bar members extend outwardly from the bolt and terminate in enlarged ends 29 forming an L-shaped structure. As illustrated in Fig. 2 the post holder block pieces are such that the bar of one lies over the bar of the other and the enlargement on the upper bar extends downwardly and the enlargement of the lower bar extends upwardly. The surfaces 30, 31 and 32 of each post holder block piece are accurately ground in parallel relation whereby the spacing between the surfaces 31 and 32 of the bar portions are exactly half of the spacing between the surfaces 30 and 32 of the enlarged portions. A nut 33 is threaded on the shank 23 of the tension bolt with a washer 34 between the nut and the upper post holder block piece whereby screwing of the nut toward the base block clamps the post holder block pieces in selected position, and turning the nut to slightly release the clamping action thereof permits either or both of the post holder block pieces to be swung around the shank 23 in a plane perpendicular thereto. Each of the block pieces has threaded apertures 35 extending through the enlarged portions thereof substantially in the plane of the surface 31 for receiving the threaded end 36 of the indicator post 26. The ends of the threaded apertures 35 are preferably counterbored as at 37 of suitable size to receive the plane cylindrical portion of the post 26 adjacent the threaded end thereof to aid in removing any play in the connection between the post and the post holder blocks.

In using an indicator mounting constructed and assembled as described the nut 33 and clamp bolt 22 are retracted until the sleeve 24 is larger than the shaft or hub to which it is to be applied. The entire assembly is then moved over the shaft or hub and the clamp or tension bolt 22 turned until the flexible member 14 tightly draws the spring sleeve into clamping engagement with the shaft or hub. Then the post 26 of the dial indicator 2 is threaded into the aperture 35 of one of the post holder block pieces. If desired a second indicator post (not shown) may be threaded into the threaded aperture 35 of the other post block holder piece. An indicator (not shown) may be mounted and adjusted on the second post 26 in a conventional manner. The post holder block pieces are swung about the bolt shank 23 until the plunger of the indicator supported thereby is in selected position and the contact of the plunger with the parts being aligned is such that the hands 6 can be moved in either direction in taking readings. The nut 33 is then turned to clamp the post holder block pieces in selected position.

When both shafts are turned together and readings taken at intervals the indicator plungers will always contact the same points so irregularity in the coupling flanges or hubs will be eliminated and the readings taken, for example every 90°, will indicate the offset in the axes of the shafts and such misalignment may be corrected by moving the machinery on its base to correct horiozntal misalignment and by adding or removing shims to correct vertical misalignment. In the case of angular misalignment one side of the base is moved relative to the other and then readings taken and the process repeated until accurate alignment is obtained.

It is believed obvious I have provided a novel indicator mounting which is quickly and accurately arranged on and clamped to a shaft or hub and accurately holds indicators for desired movement in making tests for misalignment of shafts and the like.

What I claim and desire to secure by Letters Patent is:

1. An indicator mounting for alignment of shafts and the like comprising, an elongated base block, a flexible member having ends secured to the respective ends of the base block whereby the flexible member and block combined will encircle a shaft member to be aligned, a split sleeve of spring-like material inside of the flexible member and block and urging same outwardly whereby said sleeve may be sleeved over said shaft member and substantially completely embrace same, means on the base block and engageable with the sleeve for urging the base block and sleeve apart for tightening the flexible member and sleeve on the shaft member, a holder block pivotally mounted on the base block, means for clamping said holder block to the base block to hold said holder block in selected position, an indicator post secured to the holder block and extending therefrom, and a dial indicator adjustably mounted on the indicator post and having an operating member engageable with members to be aligned.

2. An indicator mounting for alignment of shafts and the like comprising, a base block having a concave arcuate lower face, a flexible member, means pivotally connecting the flexible member to the ends of the base block whereby the flexible member and block combined will encircle a shaft member to be aligned, a split spring sleeve inside of the flexible member and block and urging same outwardly whereby the sleeve can be moved onto the shaft member and substantially completely embrace same, said base block having a threaded aperture extending through the central portion thereof perpendicular to the concaved arcuate lower face, a tension screw threaded in the threaded aperture in the base block into engagement with the sleeve for urging the base block and sleeve apart to tighten the flexible member and sleeve on the shaft member whereby the sleeve distributes the pressure from the flexible member to the shaft, a plane face on the base block oppositely disposed relative to the concaved arcuate lower face and substantially perpendicular to the axis of the tension screw, holder blocks rotatably mounted on the tension screw, means engaging the holder blocks to hold same in selected position, indicator posts secured to the holder blocks, and dial indicators adjustably mounted on the indicator posts and having operating members engageable with shaft members to be aligned.

3. An indicator mounting for alignment of shafts and the like comprising, a base block having a concave arcuate lower face, a flexible member, means connecting the flexible member to the ends of the base block whereby the flexible member and block combined will encircle a shaft member to be aligned, a split spring sleeve inside of the flexible member and block and urging same outwardly whereby the sleeve can be moved onto the shaft member, said base block having a threaded aperture extending through the central portion thereof perpendicular to the concaved arcuate lower face, a tension screw threaded in the threaded aperture in the base block into engagement with the sleeve for urging the base block and sleeve apart to tighten the flexible member and sleeve on the shaft member, a plane face on the base block oppositely disposed relative to the concaved arcuate lower face and substantially perpendicular to the axis of the tension screw, mating holder blocks having aligned apertures for rotatably mounting the holder blocks on the tension screw, said holder blocks having interengaging faces and faces engaging the plane surface of the base block, which surfaces are all parallel, means engaging the holder blocks to hold same in selected position, indicator posts secured to the holder blocks, and dial indicators adjustably mounted on the indicator posts and having operating members engageable with shaft members to be aligned.

4. An indicator mounting for alignment of shafts and the like comprising, a base block having a concave arcuate lower face and spaced transverse apertures extending through the block adjacent the ends thereof, a flexible member having apertures at the ends thereof for alignment with the transverse apertures in the block, means extending through the apertures in the flexible member and block to pivotally connect same whereby the flexible member and block combined will encircle a shaft member to be aligned, a split spring sleeve inside of the flexible member and block and urging same outwardly whereby the sleeve can be moved onto the shaft member, said base block having a threaded aperture extending through the central portion thereof perpendicular to the concaved arcuate lower face, a tension screw threaded in the threaded aperture in the base block into engagement with the sleeve for urging the base block and sleeve apart to tighten the flexible member and sleeve on the shaft member, a plane face on the base block oppositely disposed relative to the concaved arcuate lower face and substantially perpendicular to the axis of the tension screw, mating holder blocks having aligned apertures for rotatably mounting the holder blocks on the tension screw, said holder blocks having interengaging faces and faces engaging the plane surface of the base block, which surfaces are all parallel, clamp means on the tension screw for engaging the holder blocks to hold same in selected position, said holder blocks having threaded apertures therein spaced from the tension screw, indicator posts having threaded ends secured in the threaded apertures in the holder blocks, and dial indicators adjustably mounted on the indicator posts and having operating members engageable with shaft members to be aligned.

References Cited in the file of this patent

UNITED STATES PATENTS

| | | |
|---|---|---|
| 575,857 | Sly | Jan. 26, 1897 |
| 1,524,377 | Anderson | Jan. 27, 1925 |
| 2,656,607 | Harding | Oct. 27, 1953 |

FOREIGN PATENTS

| | | |
|---|---|---|
| 346,025 | Germany | Dec. 23, 1921 |